US012326800B2

(12) United States Patent
Correia Villa Real et al.

(10) Patent No.: US 12,326,800 B2
(45) Date of Patent: Jun. 10, 2025

(54) DATA TRANSFORMATION FOR ACCELERATION OF CONTEXT MIGRATION IN INTERACTIVE COMPUTING NOTEBOOKS

(71) Applicant: INTERNATIONAL BUSINESS MACHINES CORPORATION, Armonk, NY (US)

(72) Inventors: Lucas Correia Villa Real, São Paulo (BR); Renato Luiz de Freitas Cunha, São Paulo (BR); Renan Francisco Santos Souza, Rio de Janeiro (BR); Marco Aurelio Stelmar Netto, São Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 251 days.

(21) Appl. No.: 17/683,279

(22) Filed: Feb. 28, 2022

(65) Prior Publication Data
US 2023/0012543 A1 Jan. 19, 2023

Related U.S. Application Data

(60) Provisional application No. 63/222,902, filed on Jul. 16, 2021.

(51) Int. Cl.
*G06F 11/3604* (2025.01)
*G06F 8/30* (2018.01)
*G06F 11/34* (2006.01)

(52) U.S. Cl.
CPC ........... *G06F 11/3604* (2013.01); *G06F 8/30* (2013.01); *G06F 11/3438* (2013.01)

(58) Field of Classification Search
None
See application file for complete search history.

(56) References Cited

U.S. PATENT DOCUMENTS 6,934,755 B1   8/2005   Saulpaugh et al.
7,392,302 B2   6/2008   Halpern
(Continued)

FOREIGN PATENT DOCUMENTS

CN   103246564 B   6/2016
EP   2 812 801 B1   4/2019
(Continued)

OTHER PUBLICATIONS

Li, K. et al., "Approximate Query Processing: What is New and Where to Go?"; Data Science Engineering (2018); vol. 3, pp. 379-397.
(Continued)

*Primary Examiner* — Lewis A Bullock, Jr.
*Assistant Examiner* — Mark A Gooray
(74) *Attorney, Agent, or Firm* — Intelletek Law Group, PLLC; Gabriel Daniel, Esq.

(57) ABSTRACT

A method of data transformation for acceleration of context migration includes monitoring user actions in a source code development environment using fragment-based source code documents are monitored. A content of each fragment of the source code document is determined. A sequence of execution of the fragments is determined. A status of a project captured by the source code development environment is determined. A fidelity of the data to be transformed to a new execution environment is determined. Upon determining that a new execution environment is warranted based on the determined fidelity, the new execution environment is determined. The one or more fragments are then executed in the new execution environment.

15 Claims, 9 Drawing Sheets

(56) References Cited

U.S. PATENT DOCUMENTS

| | | | |
|---|---|---|---|
| 8,356,347 | B2 | 1/2013 | Berger et al. |
| 8,405,666 | B2 | 3/2013 | Masood |
| 9,189,261 | B2 | 11/2015 | Masood |
| 9,380,107 | B2 | 6/2016 | Li et al. |
| 9,507,630 | B2 | 11/2016 | Addepalli et al. |
| 9,619,297 | B2 | 4/2017 | Jain et al. |
| 9,697,245 | B1 | 7/2017 | Butler et al. |
| 10,205,377 | B1 | 2/2019 | Bianco et al. |
| 10,642,627 | B2 | 5/2020 | Wang et al. |
| 10,659,387 | B2 | 5/2020 | Udupi et al. |
| 10,725,638 | B1* | 7/2020 | Gardner .............. G06F 3/04845 |
| 10,742,694 | B2 | 8/2020 | Ma |
| 11,243,817 | B2* | 2/2022 | Custodio ................. G06F 9/505 |
| 2011/0320766 | A1* | 12/2011 | Wu ..................... G06F 9/30076 712/E9.016 |
| 2015/0089382 | A1 | 3/2015 | Feng et al. |
| 2016/0036923 | A1 | 2/2016 | Phanishayee et al. |

FOREIGN PATENT DOCUMENTS

| | | |
|---|---|---|
| KR | 101654395 B1 | 9/2015 |
| WO | 2010/030489 A2 | 3/2010 |

OTHER PUBLICATIONS

Li, Y. et al., "Minimizing Context Migration in Mobile Code Offload"; IEEE Transactions on Mobile Computing (2017); vol. 16:4; pp. 1005-1018.

Mehta. R. K., et al., "Leveraging Checkpoint/Restore to Optimize Utilization of Cloud Compute Resources"; 40th Annual IEEE Conference on Local Computer Networks (2015); 8 pgs.

Shih, L. et al., "Text Bundling: Statistics-Based Data Reduction", et al., Proceedings of the Twentieth International Conference on Machine Learning (2003), 8 pgs.

Slaney, M. et al., "Locality-Sensitive Hashing for Finding Nearest Neighbors"; IEEE Signal Processing Magazine (2008); pp. 128-131.

Mell, P. et al., "Recommendations of the National Institute of Standards and Technology"; NIST Special Publication 800-145 (2011); 7 pgs.

Litzkow, M. et al., "Checkpoint and Migration of UNIX Process in the Condor Distributed Processing System"; Technical Report #1346 (1997); 9 pgs.

Thirumuruganathan, S. et al., "Approximate Query Processing for Data Exploration using Deep Generative Models"; arXiv:1903.10000v3 [cs.DB] (2019); 12 pgs.

* cited by examiner

DATA TRANSFORMATION FOR ACCELERATION OF CONTEXT MIGRATION IN INTERACTIVE COMPUTING NOTEBOOKS

BACKGROUND

Technical Field

The present disclosure generally relates to data science, and more particularly, to computer systems that are configured to facilitate migration of context in interactive source code development environments.

Description of the Related Art

In recent years, data science has become a salient consideration in various industries, being responsible for transforming data into knowledge and insights supporting decision-making processes. Specific knowledge from data science basics, such as mathematics, artificial intelligence, databases, cloud computing, and data visualization often needs to be applied to a particular industry domain (e.g., oil & gas, weather pattern, retail). To that end, data scientist may perform experiments and properly document them in interactive computing notebooks, such as Jupypter® notebooks. The data scientists' and related personnel may be developing applications and computer models using such notebooks, which include an ordered list of cells, sometimes referred to herein as code fragments. Each cell (fragment) has a source code or markup for document rendering, which enables a form of literate programming, with source code, its output, and documentation located closely together. Some parts of the code may involve a specialized computing resource, often not available on the user's own computer device, (e.g., accelerators, such as a graphics processing unit (GPU), or a field programmable gate array (FPGA), and/or large computing power (e.g., supercomputers) to be able to process those parts in a time efficient way. The transfer of a context of the program execution to a different computing environment, sometimes referred to herein as migration, involves a step of checkpointing, wherein the execution state of the process (e.g., its memory state, open files, program counter, etc., —referred herein as the program's "context") is saved to persistent storage.

Often, the size of the context to be migrated is impeded by the high volume of data that a user is manipulating while developing or improving a model in the interactive fragment-based source code documents (i.e., interactive computing notebooks). When the context becomes large with respect to the computing resources available, it takes longer to transfer the context to another computing environment, which not only results in a poor user experience, but also significantly burdens network, computing, and storage resources.

SUMMARY

According to various exemplary embodiments, a computing device, a non-transitory computer readable storage medium, and a method of data transformation for acceleration of context migration are provided. User actions in a source code development environment using fragment-based source code documents are monitored. A content of each fragment of the source code document is determined. A sequence of execution of the fragments is determined. A status of a project captured by the source code development environment is determined. A fidelity of the data to be transformed to a new execution environment is determined. Upon determining that a new execution environment is warranted based on the determined fidelity, the new execution environment is determined. The one or more fragments are then executed in the new execution environment.

In one embodiment, the determination of a content includes at least one of: determining whether the fragment is a hot spot, executing a count of the fragment, or determining a type of data in the fragment.

In one embodiment, determining whether the fragment is a hot spot includes determining how many times a fragment has been executed.

In one embodiment, determining the new execution environment includes determining a type of computing platform to more efficiently execute the fragment based on a determination of a type of data in the fragment.

In one embodiment, the lower the determined fidelity, the more aggressive one or more techniques are applied with the type of data to be transformed.

In one embodiment, the determination of the fidelity is automatically determined by a data transformation handler module of the migration engine.

In one embodiment, a user interface of the source code document is updated by adding documentation fragments that explain how much of a program's content has been saved in a data reduction process during the execution of the one or more fragments in the new execution environment.

In one embodiment, upon executing the one or more fragments in the new execution environment, a migration back from the new execution environment to an original environment for execution is facilitated.

In one embodiment, transforming the data includes: upon determining that the data relates to text processing, cutting away a predetermined percentage of the sentences, and upon determining that the data relates to numerical and/or image processing, reshaping input grids, applying lossy compression, and/or cropping the grids according to a rendering viewport used to display results to a user.

In one embodiment, the determination of the status is based on an execution count and an order of execution between the fragments.

In one embodiment, the status relates to an initial phase, an execution phase, or a final phase.

In one embodiment, the determination of the data fidelity level is by observing a behavior of the user via actions of one or more users captured in a source code development environment.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

Figure 1:
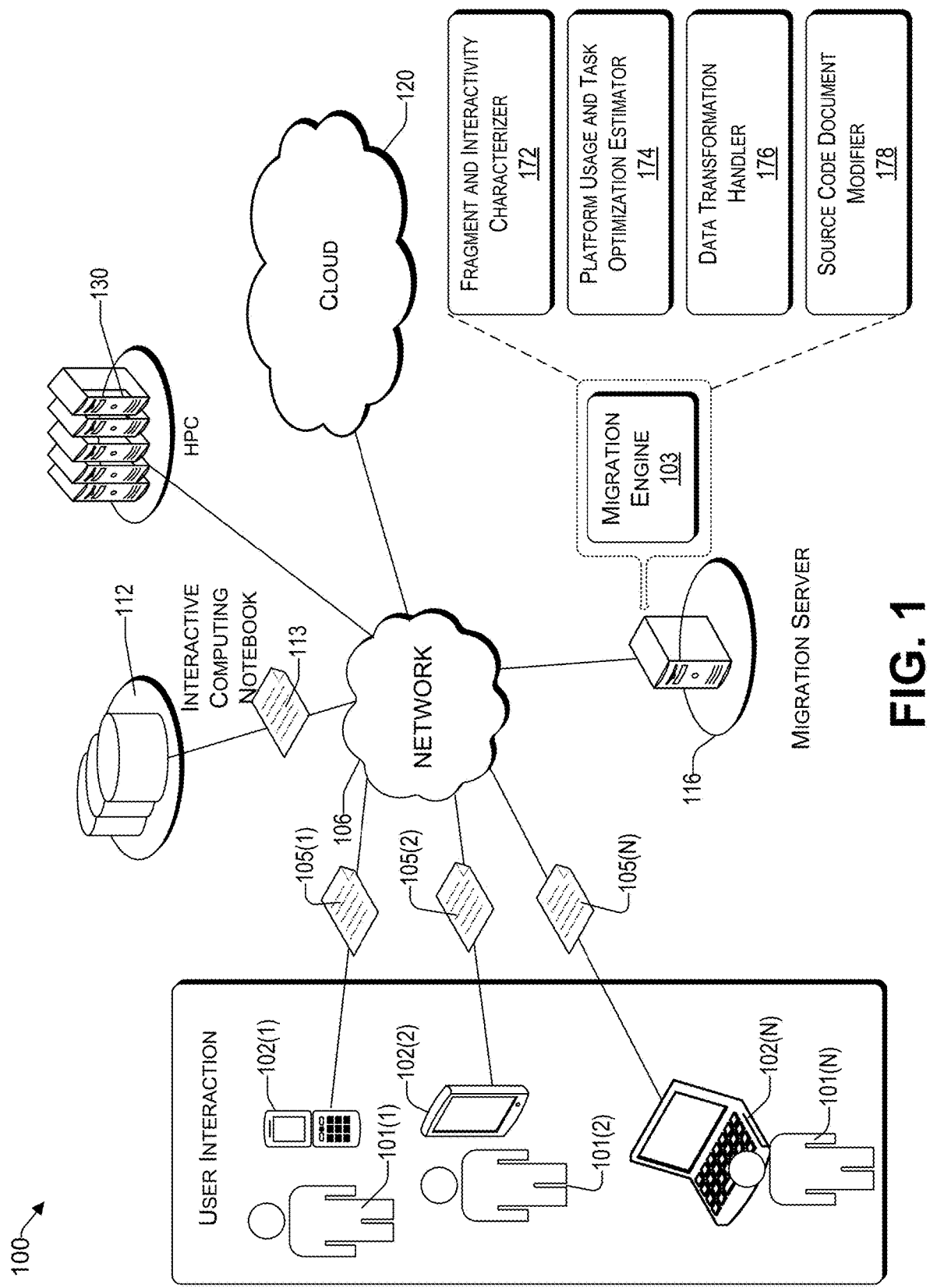
FIG. 1 illustrates an example architecture of a system that facilitates a migration of context in interactive source code development environments, consistent with an illustrative embodiment.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure generally relates to systems and computerized methods of facilitating the migration of the development of a code to different computing platforms. Today, literate programming or literate computing tools are used by countless programmers. Such tools facilitate presenting data analyses in the form of a narrative. In this regard, source code development environments, such as interactive computing notebooks, can provide a summary of the actions that a user has taken in the development of a model. A computing notebook is an interactive computing environment that is configured to provide a notebook document. A notebook document may be a Java Script Object Notation (JSON) document that includes an ordered list of input/output cells that may include, without limitation, text, source code, plots, figures, expressions of mathematical relationships, rich media, etc. An interactive computing notebook comprises a sequence of cells, sometimes referred to herein as a code fragment or notebook fragment. As used herein, a cell is a multiline text input field. The execution behavior of a cell is determined by the cell's type. There are generally three types of cells: code cells, markdown cells, and raw cells.

The interactive computing notebooks discussed herein can be used, for example, to accelerate machine learning modeling. The typical workflow using interactive computing notebooks enables the data scientist to write comments based on markup languages. For example, one or more data scientists and the related personnel, collectively referred to herein as a development team, may be developing applications and computer models using such an interactive computing notebook. During different stages of the development, a part of the code may benefit or require a different computing platform, such as an accelerator (e.g., GPU, FPGA, etc.), or one or more large computing machines to be able to process those portions of the code time and energy efficiently. The migration may involve checkpointing to save the program's execution context. As used herein, checkpointing relates to storing an image of a state of an application, so that the application can restart from this point. One way of implementing checkpointing is to stop the application, copy all the relevant data from the memory to a reliable storage, such as a parallel file system. This saved file can then be migrated onto another computing platform for further processing. In this way, the execution does not begin anew, but is able to resume from the latest state (i.e., checkpoint).

Checkpointing is salient in the live migration of programs to a different machine (i.e., computing platform) so that core routines can execute on computers with more processing power or specialized resources, for instance. The process of live migration typically begins by stopping the process right before the migration begins, saving its execution context to a file, transferring that file over the network to the new host, restoring it at the new host, and continuing the execution on this new computing platform from where it stopped. However, depending on the state of the process, the size of the checkpoint can be very large and its transfer over the network can take substantial time to complete, based on the computing platform used for the migration. This challenge is exacerbated when the data sets are massive as in the case of big data, making the migration of the context time, computing resource, and network bandwidth intensive.

In one aspect, the teachings herein reduce the amount of data when migrating contexts of development of a code to a different computing platform. Data transformation for acceleration of context migration to a different computing platform is provided for an interactive computing environment that utilizes fragment-based source code documents. A development phase can be detected and a data fidelity index for the migration can be calculated. In one embodiment, a fidelity picker may provide a range from which a user can select to simplify the data (e.g., make it smaller) processed by cells of the interactive computing notebook. In various embodiments, the fidelity selection may be alpha-numeric (e.g., 0 to 10, A to F), descriptive (e.g., none, low, medium, and high), based on color (e.g., red, green, and yellow), or any other suitable scale (e.g., 0 to 100, where 100 is a highest quality migration at the cost of computing efficiency and time, and 0 representing the lowest quality migration), which can be implemented in a very time and computing resource efficient way.

By virtue of the teachings herein, an improved experience is provided to a user engaging in interactive and fragment-based source code documents (i.e., interactive computing notebooks). Further, a more efficient use of a computing infrastructure is provided by adjusting the resources to the computational requirements, thereby saving time and computational resources. These benefits are achieved by eliminating data inside the execution context that would not be utilized at a specialized computing environment. The techniques described herein may be implemented in a number of ways. Example implementations are provided below with reference to the following figures.

Example Architecture

FIG. 1 illustrates an example architecture 100 of a system that facilitates a migration of context in interactive source code development environments, sometimes referred to herein as an interactive computing notebook, consistent with an illustrative embodiment. Architecture 100 may include one or more users 101(1) to 101(N) who can interact individually or collaboratively with interactive computing notebooks 113 stored in a data repository 112. The interactive computing notebook 113 is a representation of all content visible in an application being developed by the one or more users 101(1) to 101(N), including inputs and outputs of the computations, explanatory text, mathematics, images, and rich media representations of objects. Each user 101(1) to 101(N) can interact with the interactive computing notebook 113 by way of sending and receiving electronic data packages 105(1) to 105(N) over a network 106. The electronic data packages 101(1) to 105(N) may include various user interactions with the cells of the interactive computing notebook 113, such as, without limitation, cell contents, length of time a user interacts with a cell, changes in the code (e.g., including changes in variable values, functions, modules, etc.), data loads and transformations, definition of models, which cell(s) a user interacts with most, order of execution, etc.

There is a network 106 that allows the various user devices 102(1) to 101(N) to communicate with a data repository 112, a migration server 116, an (e.g., on-premise) high performance computing (HPC) cluster 130, and/or each other. The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet, that provides various ancillary services, such as communication with various databases, the Internet, and the cloud 120.

For discussion purposes, different user/computing devices (e.g., 102(1) to 102(N)) appear in the drawing, to represent some examples of the client devices that may be used by a user (e.g., 101(1) to 102(N)) to communicate over the network 106. Today, user devices typically take the form of portable handsets, smart-phones, tablet computers, personal digital assistants (PDAs), and smart watches, although they may be implemented in other form factors, including consumer, medical, and business electronic devices.

The data repository 112 is configured to store one or more computing notebooks that may be created by the migration engine 103 of the migration server 116. The migration server 116 may comprise a group of computing resources that hosts a migration engine 103 and executes the user program (i.e., the model being developed inside the interactive computing notebook). In one embodiment, the migration engine 103 has four main modules for facilitating a migration of the user program's execution context from one computing platform to another. There may be fragment and interactivity characterizer module 172 that is operative to determine the development life cycle and interaction with the fragments, while the user develops a model.

The migration engine 103 may include a platform usage and task optimization estimator module 174 that is operative to determine the benefits for the user when transforming the data. Considerations may include, without limitation, platform cost reduction or acceleration of tasks. There may be a data transformation handler module 176 that is operative to determine possible data transformation, such as, without limitation, resolution degradation of image-based data, decimation and resampling of meshes, summarization of text-based datasets, approximate query processing of database data, etc., and performing the same. There may be a source code document modifier module 178 that is operative to transform the source code document to add options of data transformation, as well as the benefits and/or drawbacks of each transformation. In this way, the user can make informative decisions as to the type of transformation of the data to use.

At predetermined intervals or upon a trigger event, the migration engine 103 captures the actions taken by the data scientist from the interactive computing notebook 113 stored in the data repository 112, and determines a status of the development phase, as well as whether a migration to another computing platform such as the HPC 130 or cloud 120 is warranted. These concepts are explained in more detail below in the context of the discussion of FIGS. 2 and 3.

While the data repository 112, the migration server 116, HPC 130, and computing devices 102(1) to 102(N) are illustrated by way of example to be on different platforms, it will be understood that, in different embodiments, these platforms may be combined in different combinations. In other embodiments, one or more of these computing platforms may be implemented by virtual computing devices in the form of virtual machines or software containers that are hosted in the cloud 120, thereby providing an elastic architecture for processing and storage. The cloud is discussed in more detail later.

Example Conceptual Overview of System

Figure 2:
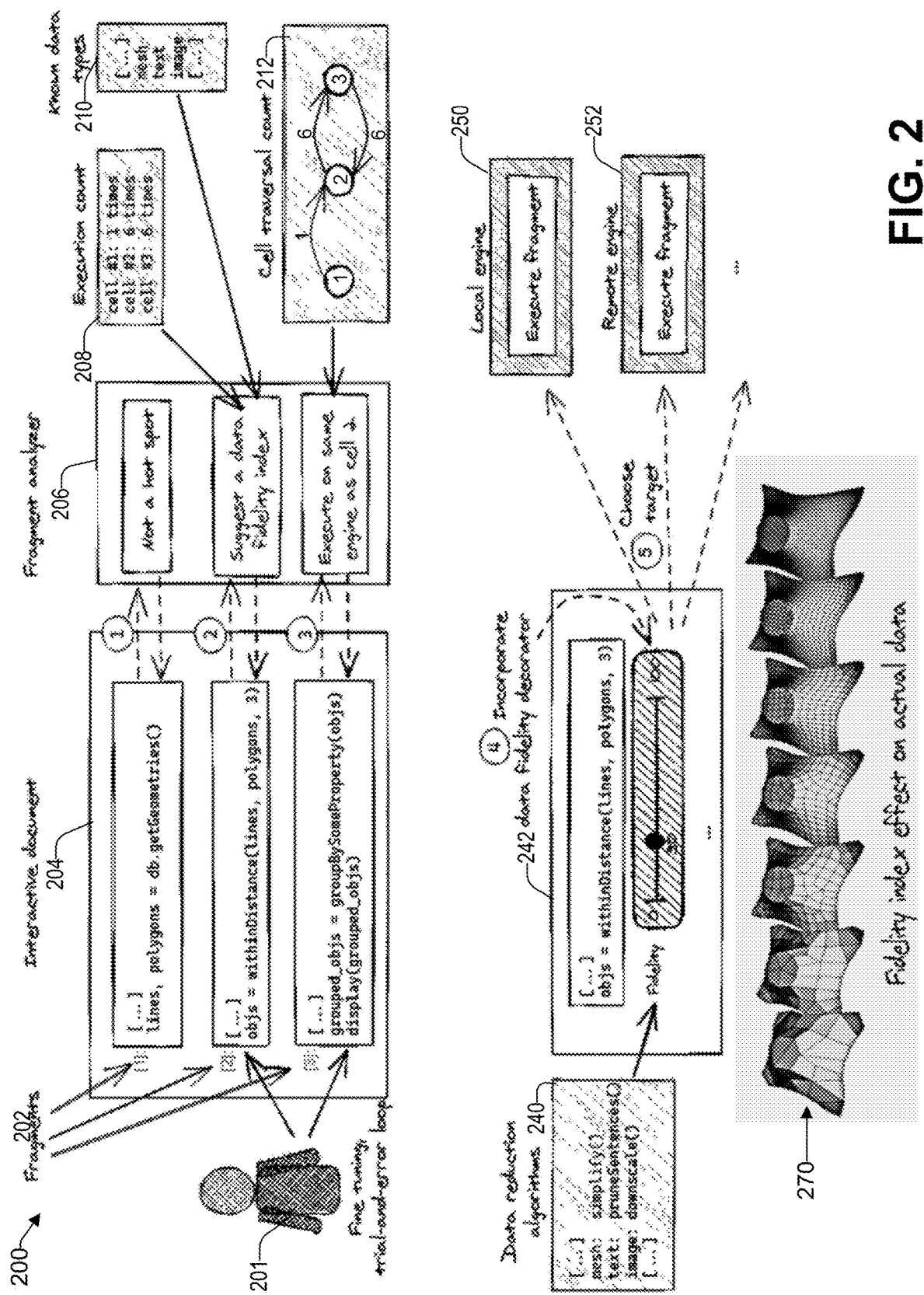
FIG. 2 is a conceptual overview of a migration of context in an interactive source code development environment, consistent with an illustrative embodiment.

Reference now is made to FIG. 2, which illustrates a conceptual overview of a migration of context in an interactive source code development environment, consistent with an illustrative embodiment. For discussion purposes, aspects of the system 200 will be discussed with reference to FIG. 1. As mentioned above, a data scientist may be involved in a process of developing a machine learning model. The development of the model may be in the context of a computing notebook, which is configured to store cells in the development of the model.

In system 200, the data scientist, sometimes referred to herein as a user 201, interacts with the computing document (i.e., notebook) 204 to create and/or tune models. An interactive computing notebook comprises a sequence of cells, sometimes referred to herein as fragments 202. By way of example and not by way of limitation, FIG. 2 illustrates three fragments 202. Each fragment 202 represents a cell that is worked on by a user 201, where the user can enter and/or manipulate data. The migration engine captures the actions taken in the interactive document 204 by studying the content of each cell 202, the sequence of execution and a number of iterations. Actions may include, without limitation, processing of input files, processing of output files, modification of files of a cell, execution of a cell, reference to a library, etc. The fragment is analyzed (206) by the fragment and interactivity characterizer module 172. The fragment and interactivity characterizer module 172 is able to determine whether or not each fragment is a hot spot, representing how many times a cell has been executed, and therefore a more salient fragment. For example, the fragment and interactivity characterizer module 172 can perform an execution count 208 with respect to a particular fragment. This module 172 can also determine a cell traversal count 212. In the present example 212, the interactivity characterizer module 172 determines that there is a transition from the first fragment to the second fragment, which is followed by a six-time iterative transition between the second and third fragments.

In one embodiment, the fragment and interactivity characterizer module 172 can determine the data type (210) of each fragment 202. For example, this module 172 can determine that in a particular fragment, lines, polygons and meshes are being operated on. Another fragment may be interacting with a database that provides raw voice data, and so on.

In one embodiment, the fragment and interactivity characterizer module 172 can suggest a fidelity index (e.g., level) by observing the behavior of the user, and matching that to known development phases. For instance, when a user 201 is repeatedly interacting with a set of fragments 202, fine-tuning parameters, and executing the fragments in a loop, the fragment and interactivity characterizer module 172 of the migration engine 103 can identify that this user is on an early stage of development, thus a low fidelity 242 can be suggested. In some embodiments, the user 201 can use the suggested fidelity index (e.g., 300 in the present example) or make a separate selection. As indicated by the polygons 270, the higher the fidelity index, the higher the resolution of the migrated context of the project. Upon selection (e.g., either automatically by the migration engine 103 or the user 201), different data reduction algorithms can be applied to the data being migrated.

By way of example and not by way of limitation, for mesh, triangles can be eliminated; for text, natural language processing can be used to remove terms that are not relevant; for images, a compression filter can be used to reduce the size of the file containing image at the expense of lower resolution; for audio, different types of sampling rates and/or filters can be used; for graphs, connections that are not sufficiently relevant can be pruned; etc. The lower the fidelity, the more aggressive techniques can be applied with respect to the type of data used.

In one embodiment, the platform usage and task optimization estimator 174 can then send the transformed data to the appropriate computing platform. For example, the transformed data can be sent to a user device (e.g., 102(2), a local HPC 130, a cloud 120, or the migration server 116 itself to continue the processing of the data.

Accordingly, depending on the value of the selection (e.g., when "fidelity"<100), the system chooses a set of data reductions 240 and, with that, decides where to best execute (e.g., local laptop, small cloud instance, on-premise high performance computing (HPC) cluster 130, large cloud instance 120, etc.,) the cells, and transparently transfers data back and forth for execution. For instance, if high fidelity (e.g., above a predetermined threshold) is picked 242, the migration engine 103 may decide to migrate and run the code fragment on a large HPC cluster 130. Alternatively, a small cloud instance may be used if a low fidelity (e.g., below a predetermined threshold) is picked. The migration engine 103 is able to suggest a data fidelity level 242 by observing the behavior of the user, and matching the behavior to known development phases. For instance, when a user is repeatedly interacting with a set of fragments, fine-tunes parameters, and executes the fragments in a loop, the system can identify that this user is on an early stage of development. In this regard, a low fidelity can be suggested or automatically selected. In one embodiment, the data transformation handler module 176 of the migration engine 103 can determine where best to submit one or more fragments by inspecting the type of data 210 (e.g., bags of words, dense tensors, tables, etc.,) the user is working with and adapting the "compression" algorithm accordingly, discussed in more detail below.

Figure 3:
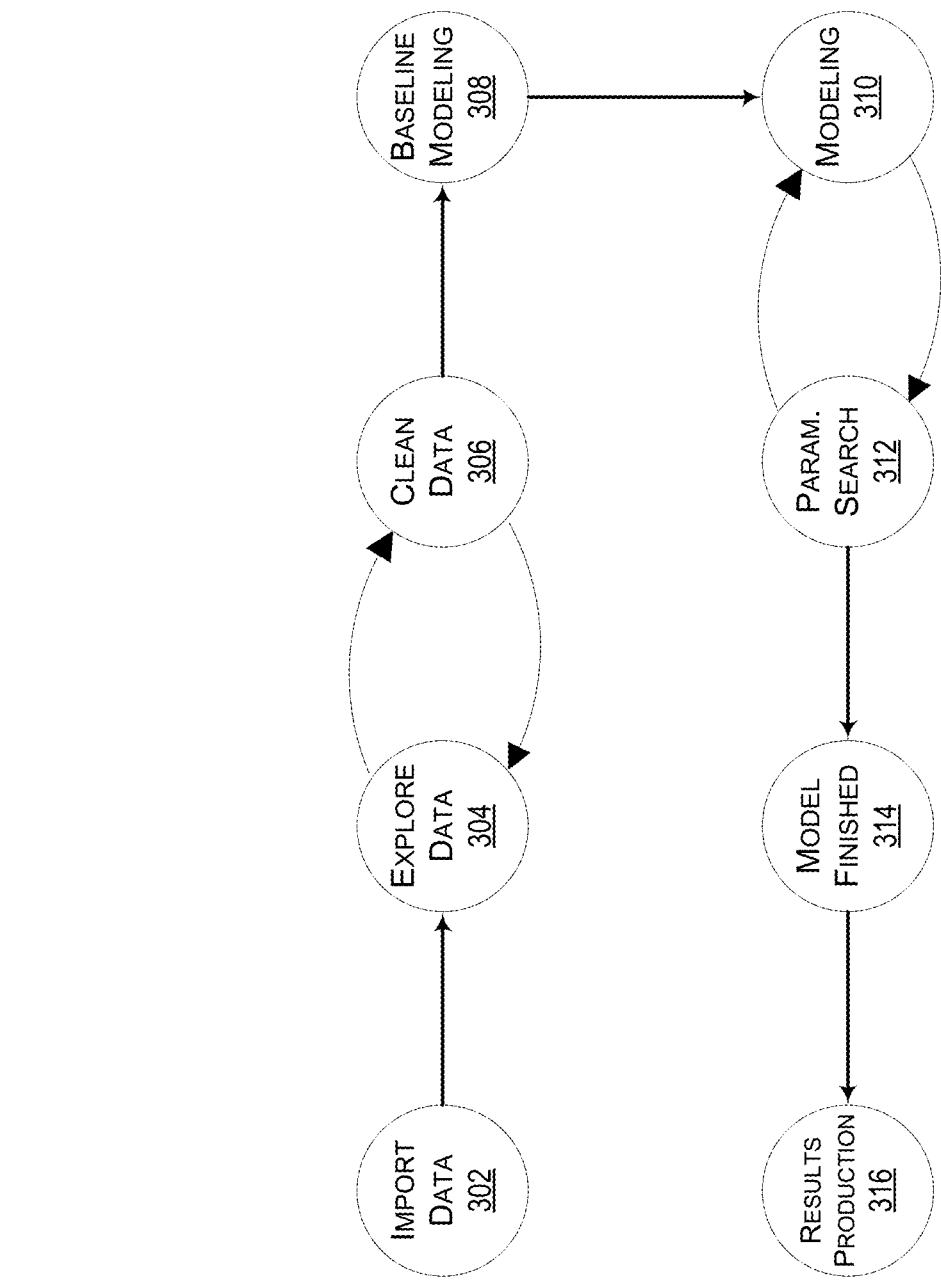
FIG. 3 is a high-level conceptual workflow that may be followed by a data scientist, consistent with an illustrative embodiment.

Reference now is made to FIG. 3, which is a high-level conceptual workflow that may be followed by one or more data scientists, consistent with an illustrative embodiment. At block 302 the input data for the model development is imported. Some tasks (i.e., captured in the fragments) may require more computational resources than others. For example, the data exploration process ("explore data" 304) may involve sampling parts of the data and inspecting it so that the data scientists can get a sense of what is included in the newly-loaded data set. The process of data cleaning ("clean data" 306) uses the full data set, but still uses fewer resources, since operations usually involve conversion between units, imputing missing features or dropping inconsistent samples. After an initial data cleaning ("clean data" 306), the data scientists may loop back to explore ("explore data" 304) the input data again to identify what else needs to be cleaned. This loop repeats until they find the data is clean enough for the next steps. By parsing the fragments in the notebook, the migration engine 103 identifies relevant functions that are salient in certain tasks in this workflow and characterize the fragments as being part of the identified step in the workflow.

Afterwards, the data scientists may use a baseline model ("baseline modeling" 308) to compare with the model they develop in the "modeling" (310) step. In this step, they design the model to be trained and specify parameters to be searched ("param. search" 312) to find the best model, typically in an optimization process (e.g., to maximize accuracy). Depending on the results of the parameter search, they need to loop back to the "modeling" (310) step to fine tune parameters or redesign the model. The modeling is finished ("model finished 313) when they are satisfied with the model quality. Finally, the one or more data scientists submit the finished model, along with its results, to production ("results production" 316).

Example Processes

Figure 4:
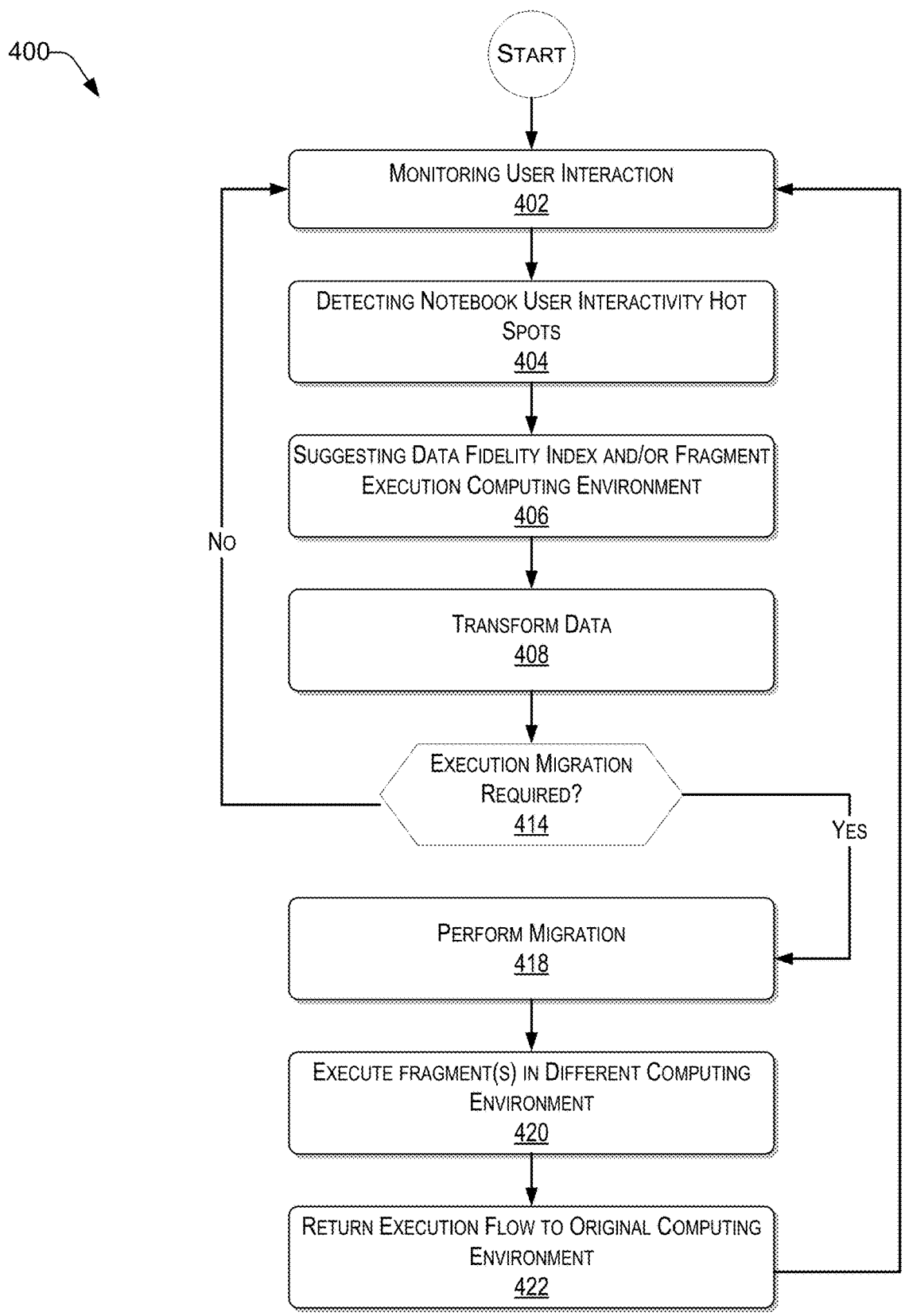
FIG. 4 is an example process for migration of a development of a code to a different computing platform, consistent with an illustrative embodiment.
Figure 5:
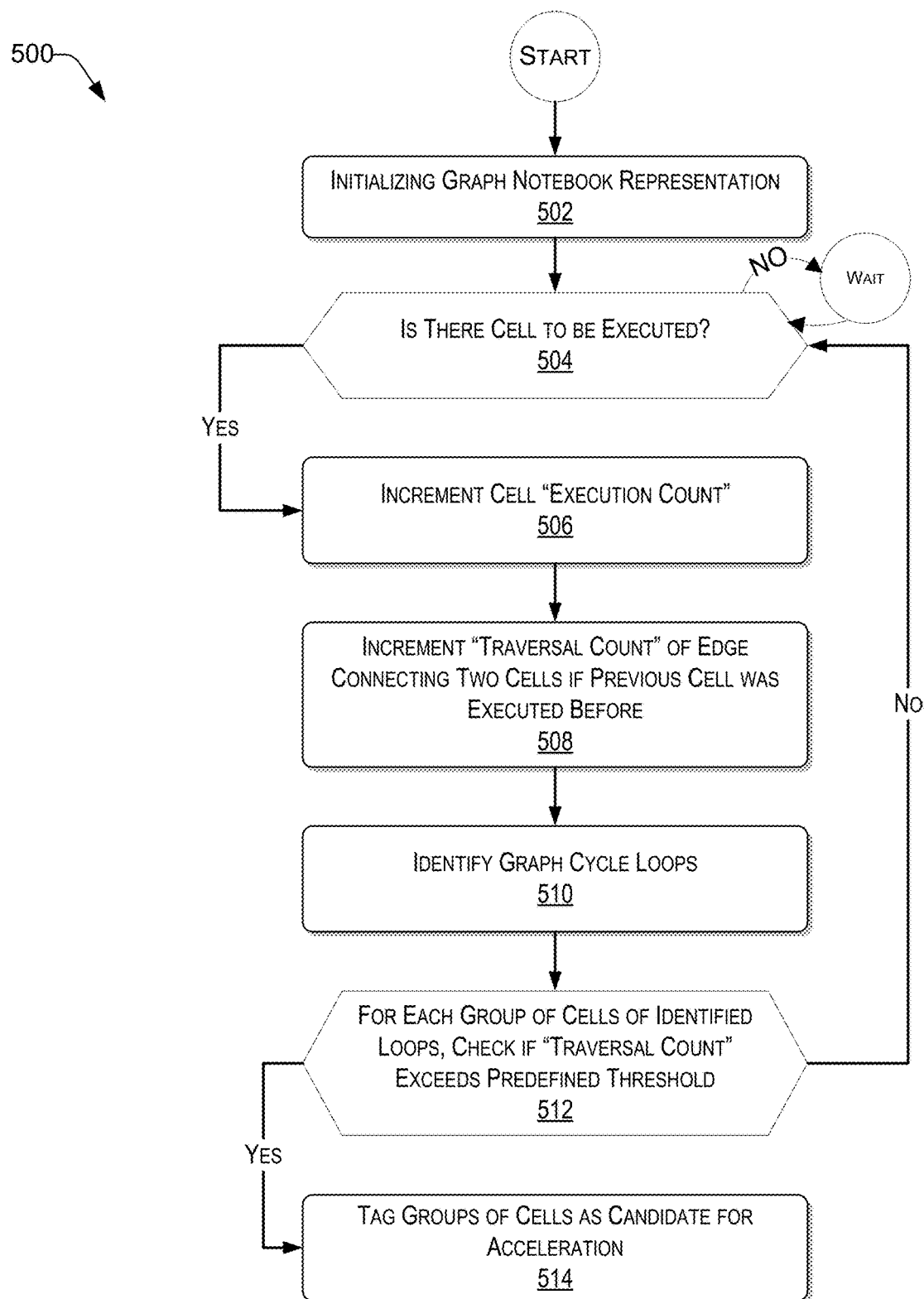
FIG. 5 is a process that provides a more detailed account of block 404 of the process of FIG. 4, consistent with an illustrative embodiment.
Figure 6:
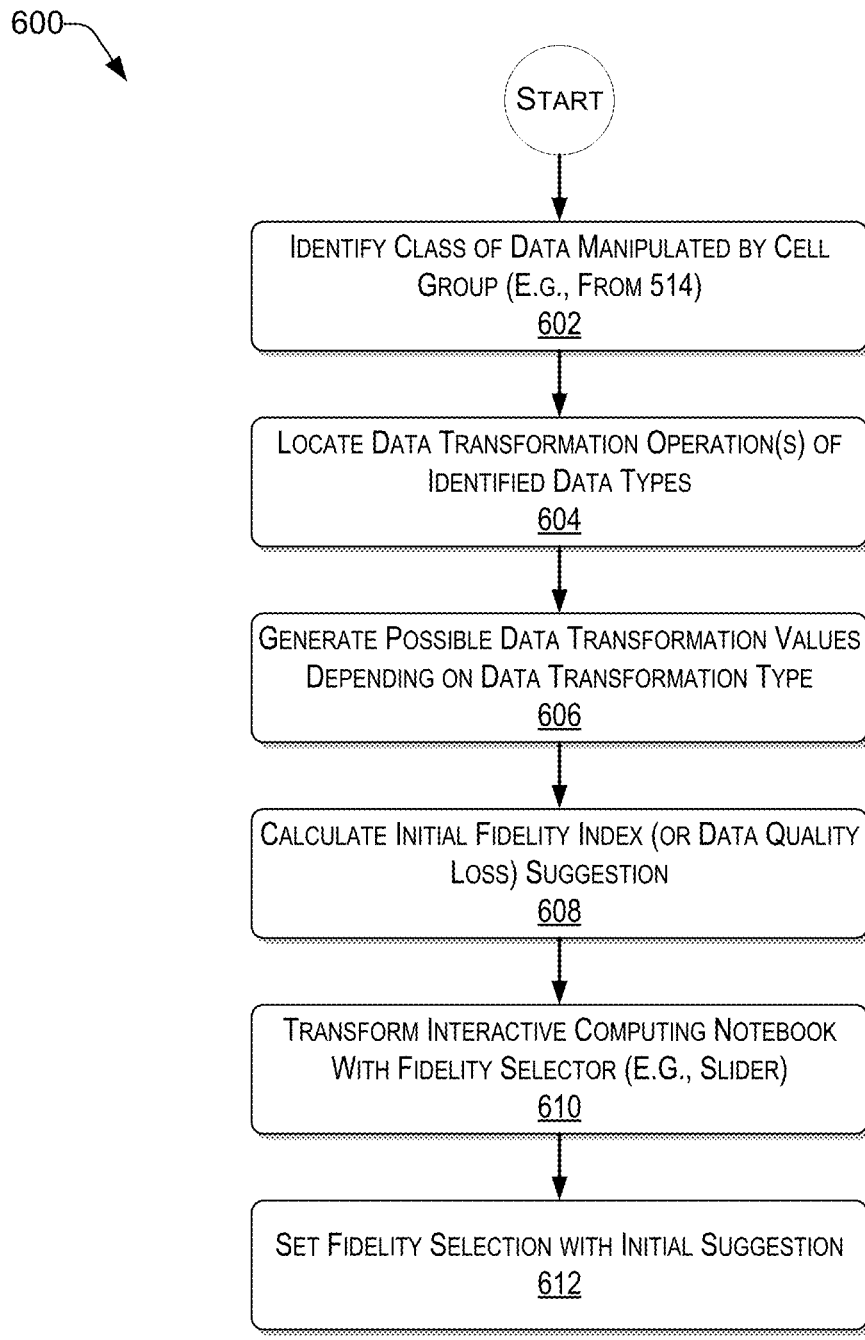
FIG. 6 is a process that provides a more detailed account of block 406 of FIG. 4, consistent with an illustrative embodiment.

With the foregoing overview of the example architecture 100 and system 200 of FIGS. 1 and 2, respectively, it may be helpful now to consider a high-level discussion of example processes. To that end, FIGS. 4 to 6 present illustrative process 400, 500, and 600 related to different aspects of a migration of context of an interactive source code development environment, consistent with illustrative embodiments. Processes 400 to 600 are each illustrated as a collection of blocks in a logical flowchart, which represents sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the processes 400 to 600 are described with reference to the architecture 100 of FIG. 1.

With reference to FIG. 4, at block 402, the migration engine 103 detects that the interactive document (i.e., notebook) is interactive and that a fragment-based source code document is opened. The migration engine 103 monitors interaction of the user with the interactive platform and fragment-based source code document, sometimes referred to herein as the interactive computing notebook 113.

At block 404, the migration engine 103 detects hot spots (i.e., frequently executed cells, often as part of a development phase), and interactions with the interactive notebook 113. In one embodiment, the data type of each particular code fragment (cell) is identified.

At block 406, the migration engine 103, based on detected hot spots, interaction, and data type, suggests the fidelity index. In one embodiment, the migration engine also suggests where to best execute the corresponding fragment. Upon determining that migration is warranted (e.g., the type of processing is better accommodated on a different computing platform), the migration engine 103 identifies a set of data transformations for data reduction of that data type. In one embodiment, the migration engine 103 estimates an impact of each suggestion, including reduced time to migrate context, reduced infrastructure cost and precision lost or gained in the model. In one embodiment, the migration engine 103 updates a user interface (UI) of the interactive and fragment-based source code document by adding documentation fragments that explain how much of the program's context has been saved in the data reduction process. This improves the awareness of the users on what is happening on the underlying platform that executes their code, including how much they are saving because of the data reduction process.

At block 408, the migration engine 103 performs data transformation based on the suggested data transformation or user defined data transformation, as discussed herein.

At block 414, the migration engine 103 determines if execution migration is appropriate in the present state of the development of the program. If not (i.e., "NO" at decision block 414), the process returns to the act of monitoring user interaction 402 and the iterative process continues.

In one embodiment, the migration engine 103 iterates over the list of objects belonging to the notebook session, serializing and storing their contents to a disk or memory-based temporary storage. If the object is of the same data type as identified at block 402, then the migration engine stores the object.

In one embodiment, the migration engine 103 applies data transformation algorithms to the relevant objects. The transformation algorithms are discussed in more detail later in the context of block 606 of FIG. 6.

In one embodiment, the migration engine 103 serializes and dumps the contents of transformed data to the same temporary storage location as that of block 414.

In one embodiment, the migration engine 103 saves the source code of the selected group of cells subject to migration to the same temporary storage location as block 414 and the serialized and dumped contents of the transformed data discussed immediately above. The migration engine 103 then transfers the collection of temporary objects and pieces of source code to the chosen remote host. This method may be assisted by various tools such as rsync.

However, if it is determined that migration is appropriate (i.e., "YES" at decision block 414), the process continues to block 418, where the migration is executed. For example, the migration engine collects received source code and objects, deserializes them into memory and recreates the notebook session. The system then executes the pieces of source code and stores the results to a disk or memory-based temporary storage.

At block 420, the migration engine 103 facilitates the migrated execution on a different computing platform, such as a user device, HPC 130, cloud 120, or the migration server itself 116. For example, the migration engine 103 facilitates the transfer of the collection of results produced to the original host where the notebook runs. The migration engine 103 aggregates the results into the list of objects managed by the notebook session. In one embodiment, the migration engine refreshes a notebook user interface (UI) so that results are rendered as the output of the notebook cells that executed on the remote host.

At block 422, the migration engine 103 facilitates the migration back from the new computing platform to the original one for execution.

Reference now is made to FIG. 5, which provides a more detailed account of block 404 of FIG. 4. At block 502 a graph is initialized by the migration engine 103, wherein the graph represents the cells (i.e., code fragments) of the notebook. For example, nodes are associated with cells (i.e., code fragments), whereas edges connecting starting and ending nodes have a "traversal count" attribute (initially set to zero). Nodes may also have an "execution count" that indicates how many times a given cell has been executed by the user. For example, each time the user executes a given cell A, the migration engine increments that cell's "execution count." Once another cell B is executed, the migration engine 103 increments cell's B "execution count" and increments the "traversal count" attribute of the edge connecting A and B.

At block 504, the migration engine 103 determines whether there is a cell to be executed. If not (i.e., "NO" at decision block 504), the migration system waits the user to add cells to be executed. However, upon determining that there is a cell to be executed (i.e., "YES" at determination block 302), the process continues with block 506, where the subject cell is executed on a given computing platform and the "execution count" incremented for the particular fragment.

At block 508, the migration engine 103 determines if a previous cell has been executed before. If so, the "traversal count" attribute of the edge connecting the two cells is incremented.

At block 510, the migration engine 103 uses an algorithm for graph cycle detection to identify loops (i.e., groups of cells that are being frequently modified and executed by the user), based on the interactive computing notebook.

At block 512, for each group of cells belonging to the identified loops, the migration engine 103 checks if their "traversal count" exceeds a predefined threshold. If not ("NO" at determination block 512), the process returns to the act of determining whether there is a cell to be executed 504, and the iterative process continues. However, upon determining that the "traversal count" does exceed the predefined threshold ("YES" at determination block 512), the process continues with block 514 where the migration engine 103 tags the group of cells as a candidate for acceleration.

Reference now is made to FIG. 6, which provides a more detailed account of block 406 of FIG. 4, consistent with an illustrative embodiment. At block 602, the migration engine 103 identifies a class (e.g., type) of data manipulated by the group of cells tagged for acceleration by block 514 discussed hereinabove in the context of the discussion of FIG. 5. Examples of classes of data may include, without limitation, text processing (e.g., NLP), containers of numerical data (e.g., HDF5 files, NumPy arrays, Pandas DataFrames), images (e.g., Python Pillow (PIL) grids), and more.

At block 604, the migration engine 103 locates data transformation operations for the identified data types that maps operations with data types.

At block 606, the migration engine 103 generates a set of possible data transformation values depending on the data transformation type. In various embodiments, different approaches can be taken. For example, for text processing, a percentage of the sentences can be cut in a way that maintains document statistics. For numerical and image processing, the input grids can be reshaped (to downsize them), lossy compression applied, the grids cropped according to the rendering viewport used to display the results to the user, etc.

At block 608, the migration engine 103 provides an initial suggestion of fidelity (e.g., data quality loss) based upon a calculation. The calculation can consider at least one of: (i) an average time it takes to execute that group of cells, (ii) a total size of the data processed by that group of cells, and/or (iii) a network bandwidth connecting the computer hosting that notebook and each of the possible destination computers that can execute that group of cells after migration. In one embodiment (A), the suggestion of the fidelity could be based on possibilities that keep the execution of the fragment in the original computing environment. In another embodiment (B), the suggestion of the fidelity could be based on maximum execution time of cells (i.e. user desired cell execution throughput).

At block 610, the migration engine facilitates a user-interface modification to be included into the notebook by, for example, adding a "fidelity slider" 242, as illustrated in FIG. 2, that lets the user speed-up the execution of that group of cells by simplifying the underlying data with one of the predefined categories of data transformation algorithms. Optionally, the user may provide their own algorithms. In one embodiment, the migration engine 103 itself selects an appropriate fidelity.

In one embodiment, at block 612 the fidelity slider 242 is initially set to a percentage established by block 608, allowing the user to change it to a different value if desired.

Example Computer Platform

Figure 7:
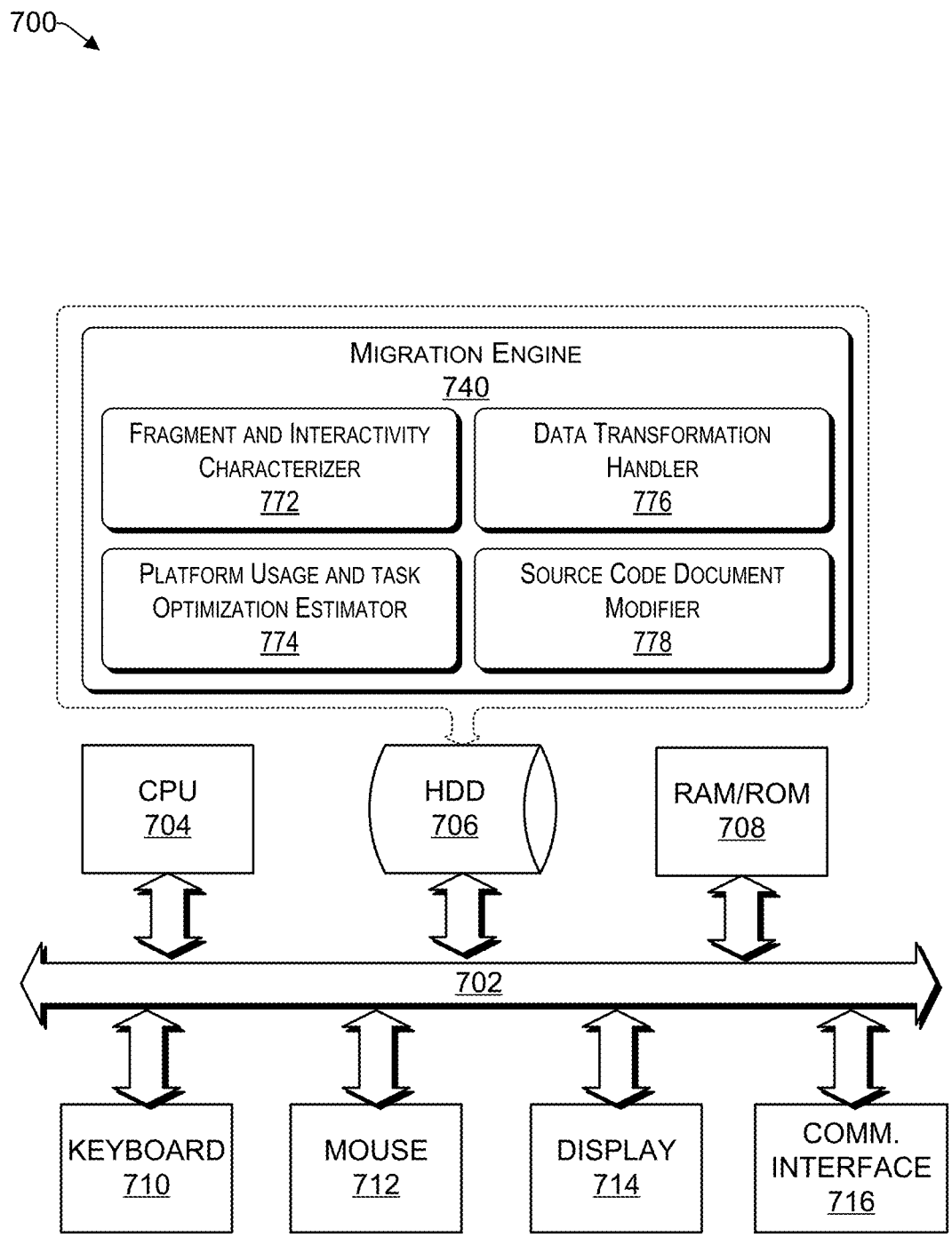
FIG. 7 provides a functional block diagram illustration of a computer hardware platform that can be used to implement a particularly configured computing device that can host a migration engine.

As discussed above, functions relating to migration of context in interactive source code development environments can be performed with the use of one or more computing devices connected for data communication via wireless or wired communication, as shown in FIG. 1 and in accordance with the architecture 200 of FIG. 2. FIG. 7 provides a functional block diagram illustration of a computer hardware platform 700 that can be used to implement a particularly configured computing device that can host a migration engine 740. In particular, FIG. 7 illustrates a network or host computer platform 700, as may be used to implement an appropriately configured server, such as the migration server 116 of FIG. 1.

The computer platform 700 may include a central processing unit (CPU) 704, a hard disk drive (HDD) 706, random access memory (RAM) and/or read only memory (ROM) 708, a keyboard 710, a mouse 712, a display 714, and a communication interface 716, which are connected to a system bus 702.

In one embodiment, the HDD 706, has capabilities that include storing a program that can execute various processes, such as the migration engine 740, in a manner described herein. The migration engine 740 may have various modules configured to perform different functions, such those discussed in the context of FIG. 1 and others. For example, the migration engine 740 may include a fragment and interactivity characterizer module 772 that is operative to determine the development life cycle and interaction with the fragments, while the user develops a model. There may be a platform usage and task optimization estimator module 774 that is operative to determine the benefits for the user when transforming the data. There may be a data transformation handler module 776 that is operative to determine possible data transformation and performing the same. There may be a source code document modifier module 778 that is operative to transform the source code document to add options of data transformation, as well as the benefits and/or drawbacks of each transformation.

While modules 772 to 778 are illustrated in FIG. 7 to be part of the HDD 706, in some embodiments, one or more of these modules may be implemented in the hardware of the computing device 700. For example, the modules discussed herein may be implemented in the form of partial hardware and partial software. That is, one or more of the components of the migration engine 740 shown in FIG. 7 may be implemented in the form of electronic circuits with transistor(s), diode(s), capacitor(s), resistor(s), inductor(s), varactor(s) and/or memristor(s). In other words, the migration engine 740 may be implemented with one or more specially-designed electronic circuits performing specific tasks and functions described herein.

Example Cloud Platform

As discussed above, functions relating to providing data transformation for acceleration of context migration in interactive computing notebooks may include a cloud 120 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
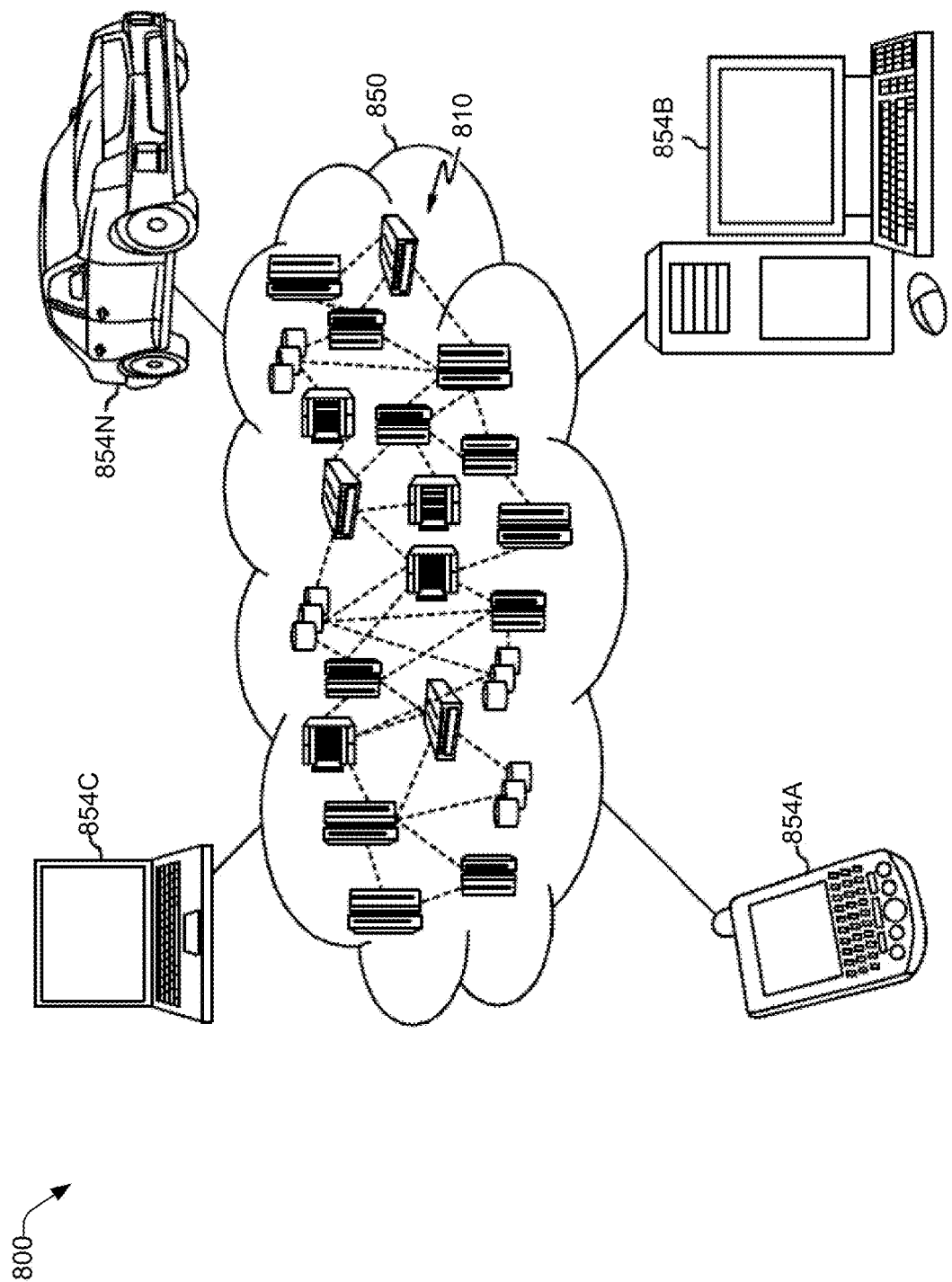
FIG. 8 depicts a cloud computing environment, consistent with an illustrative embodiment.

Referring now to FIG. 8, an illustrative cloud computing environment 800 is depicted. As shown, cloud computing environment 800 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
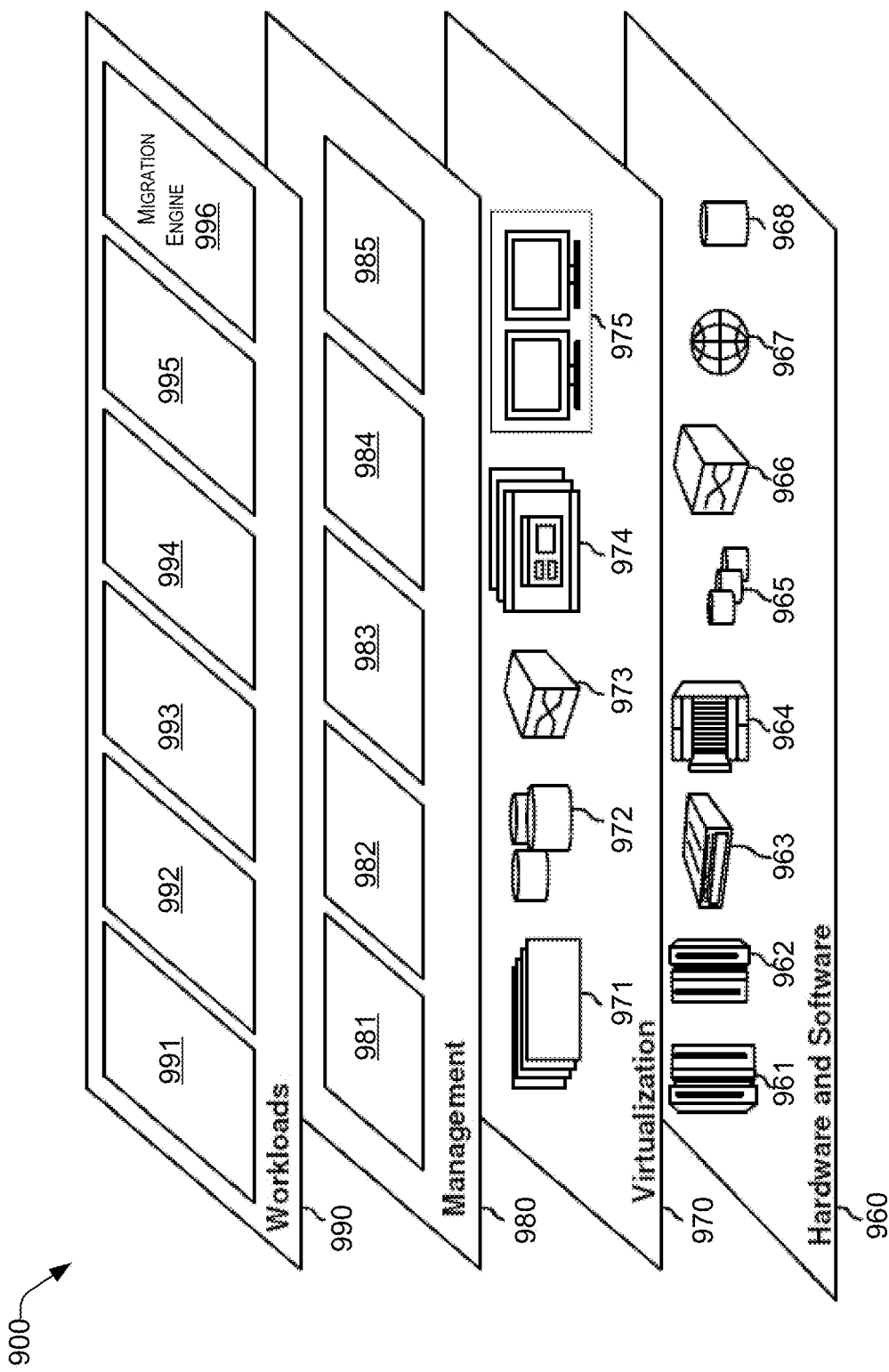
FIG. 9 depicts abstraction model layers, consistent with an illustrative embodiment.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the disclosure are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and migration engine 996, as discussed herein.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
   a processor;
   a network interface coupled to the processor to enable communication over a network;
   a storage device for content and programming coupled to the processor;
   a migration engine stored in the storage device, wherein an execution of the engine by the processor configures a user device to perform acts comprising:
   monitoring user actions in an interactive computing notebook of a source code development environment using notebook fragments, wherein user actions with the interactive computing notebook include, modifying and/or executing the notebook fragments of a source code project;
   subsequent to the monitoring:
      determining a content of each notebook fragment, wherein the content comprises determining whether the notebook fragment is a hot spot to be transformed to a new execution environment and/or determining the type of data in the notebook fragment, wherein determining whether the fragment is a hot spot is based on a user execution count of the notebook fragment being above a threshold;
      determining a development phase of the source code project based at least on the monitored user actions;
      determining a fidelity of the determined hot spots to be transformed to a new execution environment based on the monitored user actions and the determined development phase, wherein the fidelity is determined to be high fidelity if the fidelity is above a threshold;
      determining that a new execution environment is warranted based on the determined fidelity of the determined hotspots being above a threshold;
      wherein upon determining that a new execution environment is warranted:
         determining a set of data transformations for data reduction of the determined hot spots, wherein the higher the fidelity the more aggressive data transformations are determined for the data reduction;
         performing data transformations on the determined hot spots based on the determined set of data transformations;
         selecting the new execution environment for the determined hot spots; and
         executing the one or more notebook fragments of the determined hot spots in the new execution environment.

2. The computing device of claim 1, wherein determining the new execution environment comprises determining a type of computing platform to more efficiently execute the notebook fragments.

3. The computing device of claim 1, wherein the lower the determined fidelity, the more aggressive one or more techniques are applied with the type of data to be transformed.

4. The computing device of claim 1, wherein the determination of the fidelity is automatically determined by a data transformation handler module of the migration engine.

5. The computing device of claim 1, wherein the execution of the migration engine by the processor further configures the user device to perform acts comprising, updating a user interface of the source code document by adding documentation notebook fragments that explain how much of a program's content has been saved in a data reduction process during the execution of the one or more notebook fragments in the new execution environment.

6. The computing device of claim 1, wherein the execution of the engine by the processor further configures the user device to perform acts comprising, upon executing the one or more notebook fragments in the new execution environment, facilitating a migration back from the new execution environment to an original environment for execution.

7. The computing device of claim 1, wherein transforming the data comprises:
   upon determining that the determined hot spot relates to text processing, cutting away a predetermined percentage of the sentences; and
   upon determining that the determined hot spot relates to numerical and/or image processing, reshaping input grids, applying lossy compression, and/or cropping the grids according to a rendering viewport used to display results to a user.

8. The computing device of claim 1, wherein the determination of the status is based on an execution count and an order of execution between the notebook fragments.

9. The computing device of claim 1, wherein the development phase relates to an initial phase, an execution phase, or a final phase.

10. A non-transitory computer readable storage medium tangibly embodying a computer readable program code having computer readable instructions that, when executed, causes a computing device to carry out a method of data transformation for acceleration of context migration, the method comprising:
   monitoring user actions in an interactive computing notebook of a source code development environment using notebook fragments, wherein user actions with the interactive computing notebook include, modifying and/or executing the notebook fragments of a source code project;
   subsequent to the monitoring:
      determining a content of each notebook fragment of the source code document, wherein the content comprises determining whether the notebook fragment is a hotspot to be transformed to a new execution environment and/or determining the type of data in the notebook fragment, and wherein determining whether the fragment is a hotspot is based on a user execution count of the notebook fragment being above a threshold;
      determining a development phase of the source code project based at least on the monitored user actions;
      determining a fidelity of the determined hotspots to be transformed to a new execution environment based on the monitored user actions and the determined development phase, wherein the fidelity is determined to be a high fidelity if the fidelity is above a threshold;
      determining that a new execution environment is warranted based on the determined fidelity of the determined hot spots being above a threshold;
      where upon determining that a new execution environment is warranted:
         determining a set of data transformations for data reduction of the determined hot spots, wherein the higher the fidelity the more aggressive data transformations are determined for the data reduction;
         performing data transformations on the determined hot spots on the determined set of data transformations;

selecting the new execution environment for the determined hot spots; and executing the one or more notebook fragments of the determined hot spots in the new execution environment.

11. The non-transitory computer readable storage medium of claim 10, wherein determining the new execution environment comprises determining a type of computing platform to more efficiently execute the fragment.

12. The non-transitory computer readable storage medium of claim 10, wherein the determination of the fidelity is automatically determined by a data transformation handler module of a migration engine.

13. The non-transitory computer readable storage medium of claim 10, further comprising, upon executing the one or more notebook fragments in the new execution environment, facilitating a migration back from the new execution environment to an original environment for execution.

14. A computer implemented method, comprising:

monitoring user actions in an interactive computing notebook of a source code development environment using notebook fragments, wherein user actions with the interactive computing notebook includes modifying and/or executing the notebook fragments of a source code fragment;

subsequent to the monitoring:

determining a content of each notebook fragment of the source code document, wherein the content comprises determining whether the notebook fragment is a hots pot to be transformed to a new execution environment and/or determining the type of data in the notebook fragment, and wherein determining whether the fragment is a hot spot is based on a user execution count of the notebook fragment being above a threshold;

determining a development phase of the source code project based at least on the monitored user actions;

determining a fidelity of the determined hot spots to be transformed to a new execution environment based on the monitored user actions and the determined development phase, wherein the fidelity is determined to be a high fidelity if the fidelity is above a threshold;

determining that a new execution environment is warranted based on the determined fidelity of the determined hot spots being above a threshold;

wherein upon determining that a new execution environment is warranted:

determining a set of data transformations for data reduction of the determined hot spots, wherein the higher the fidelity the more aggressive data transformations are determined for the data reduction;

performing data transformations on the determined hot spots on the determined set of data transformation;

selecting the new execution environment for the determined hot spots; and executing the one or more notebook fragments of the determined hot spots in the new execution environment.

15. The method of claim 14, further comprising, upon executing the one or more notebook fragments in the new execution environment, facilitating a migration back from the new execution environment to an original environment for execution.

* * * * *